(12) United States Patent
Allen

(10) Patent No.: US 7,263,056 B2
(45) Date of Patent: Aug. 28, 2007

(54) APPARATUS AND METHODS FOR SECURING INFORMATION IN STORAGE MEDIA

(75) Inventor: Daniel J. Allen, Derry, NH (US)

(73) Assignee: Altera Corporation, San Jose, CA (US)

(*) Notice: Subject to any disclaimer, the term of this patent is extended or adjusted under 35 U.S.C. 154(b) by 216 days.

(21) Appl. No.: 10/909,274

(22) Filed: Jul. 30, 2004

(65) Prior Publication Data

US 2005/0141719 A1 Jun. 30, 2005

Related U.S. Application Data

(60) Provisional application No. 60/491,091, filed on Jul. 30, 2003.

(51) Int. Cl.
*G11B 7/24* (2006.01)
*H04L 9/00* (2006.01)

(52) U.S. Cl. .............................. 369/275.2; 369/47.28; 369/59.24; 280/277

(58) Field of Classification Search ............ 369/275.2, 369/47.28, 59.2, 59.17, 53.36, 47.19, 124.04, 369/124.14, 59.27, 59.24; 380/277; 714/718
See application file for complete search history.

(56) References Cited

U.S. PATENT DOCUMENTS 5,311,491 A * 5/1994 Yamagami et al. ...... 369/47.28
5,699,337 A 12/1997 Kobayashi
5,793,709 A 8/1998 Carley
6,046,968 A * 4/2000 Abramovitch et al. ... 369/47.28
6,137,756 A * 10/2000 Yoshida et al. .......... 369/53.36
6,377,094 B1 4/2002 Carley
2001/0055258 A1 12/2001 Carson et al.
2002/0163453 A1 11/2002 Van Dijk et al.

FOREIGN PATENT DOCUMENTS

WO    WO 02/35529    5/2002

* cited by examiner

*Primary Examiner*—Ali Neyzari

(57) ABSTRACT

The methods described herein are directed at securing information in storage media such as optical discs, magnetic disks or a combination thereof. In particular the methods describe embedding a first stream of data in a second stream of data by modulating the location of transition edges in the second stream of data. A method for writing data to a storage medium includes the steps of representing the raw (first) data to be written to the storage medium as a sequence of bits in a format appropriate for writing to a storage medium; representing second data (supplemental data) as a second sequence of bits and writing the first sequence of bits to the storage medium as a corresponding sequence of pits along a track, wherein the location of the pits along the track represents the stored first data, and while writing the first sequence of pits, modulating the locations at which transition edges of the sequence of pits are written to embed the second data in the sequence of pits.

35 Claims, 6 Drawing Sheets

APPARATUS AND METHODS FOR SECURING INFORMATION IN STORAGE MEDIA

CROSS-REFERENCE TO RELATED APPLICATIONS

This application claims benefit to U.S. Provisional Patent Application Ser. No. 60/491,091 filed Jul. 30, 2003.

TECHNICAL FIELD

This invention relates generally to storage of information and more particularly to writing and reading secure information to and from a storage medium.

BACKGROUND

The need for storage is growing at an exponential rate, fueled by multimedia requirement for text, images, video and audio information. In order to meet this need storage systems include many diverse technologies, for example, magnetic disk drives, magnetic tape drives and tape libraries, optical disk drives and optical libraries.

Optical storage systems and devices, for example, compact disc (CD) and digital versatile disc (DVD), provide high storage capacity and low media cost. These qualities make optical storage devices attractive for distribution of information, for example, copyrighted content or to backup data. An optical disk includes a plastic or glass substrate having one or more thin-film layers coated upon its surface(s). The information may be pre-recorded on the surface of the substrate by the disk manufacturer, or it may be recorded on one or more of the thin-film layers by the user. The available optical disks include, for example, compact disk audio (CD), compact disk read-only memory (CD-ROM), compact disk recordable (CD-R), CD-RW, DVD, DVD-R, DVD-RW, magneto-optical (MD), phase-change (PC) writable disks and write-once-read-many (WORM) media.

In certain types of optical disks some information, such as format marks and grooves, may be stamped onto the substrate itself, and then the substrate is coated with a storage layer that can be modified later by the user during recording of information. Typical storage layers are dye-polymer films for write-once application, tellurium alloys for ablative recording (also write-once), GeSbTe for phase-change rewritable media, and TbFeCo magnetic films for magneto-optical disks (also rewritable).

The availability of low cost CD and DVD writers has raised concerns of piracy and theft of secret data. Ideally, content providers and businesses could be protected from lost revenues due to illegal copying. Current US copyright laws allow users to make personal copies of content for backup and convenience. Various copy protection schemes have been devised to encode or encrypt the data stored on a disk to disable copying of content. Unfortunately, the existing copy protection schemes have been decoded since any personal computer (PC) can read the data stored on an optical disk and hackers learn to defeat the copy protection scheme. These schemes also violate copyright laws since often no legal copies are possible either.

In secure government, military and business applications optical disks can be a problem since large amounts of data can be mishandled or misappropriated on optical disks. Existing encryption schemes for data do not provide sufficient controls for secure data as many encryption schemes can be decoded or circumvented.

There thus remains a need for securing information stored on optical and/or magnetic media that cannot be decoded or circumvented by unauthorized users.

SUMMARY OF THE INVENTION

The methods described herein are directed at securing information in storage media such as optical discs, magnetic disks or a combination thereof. In particular, the methods describe embedding a first stream of data in a second stream of data by modulating the timing of transition edges in the second stream of data. In different embodiments, the methods embed specific information, such as the serial number of the writing disk drive and a date stamp indicative of a creation date. This allows for legal use of optical media and discourages illegal piracy.

In further embodiments directed to more secure forms of the methods, the embedded data contains additional security information such as an encryption method, level of secrecy, classifying agency, and other data to allow tracking and control of data to be stored securely. The encryption methods introduce deliberate timing changes in the pattern of recorded pits on the disks which are then used to store embedded data therein. The disks are unreadable unless the particular decoding method is known.

In an embodiment, a method for writing data to a storage medium includes the steps of representing the raw data (first data) to be written to the storage medium as a sequence of bits in a format appropriate for writing to a storage medium; representing second data (supplemental data) as a second sequence of bits and writing the first sequence of bits to the storage medium as a corresponding sequence of pits along a track, wherein the location of the pits along the track represents the stored first data, and while writing the first sequence of pits, modulating the locations at which transition edges of the sequence of pits are written to embed the second data in the transition edges of the sequence of pits.

The method can include processing the first data to generate encoded first data. The step of processing data includes using a error correcting processes such as a particular error correction code. The step of modulating the location of the transition edges further comprises modulating the timing of the transition edges to be within a range that is below a timing error budget predetermined for the particular media. In an embodiment the timing modulation is a fraction (for example, ¼ or ⅓) of the timing error budget. In one embodiment, the range is approximately 1 to 40 picoseconds.

The storage media can include one of an optical storage medium, a magnetic storage medium or a combination thereof (magneto-optical media). The storage medium can be a phase change medium. The plurality of pits and land or gap regions on the phase change storage media are defined by one of a crystalline or amorphous state of the storage medium. In magnetic media the timing modulation occurs at the transition of the material states such a magnetization, used to store the data.

The processor for representing the first and second data, modulating the timing of transition edges and embedding the second data in the transition edges is implemented within an integrated circuit, for example, a complementary metal oxide semiconductor (CMOS) integrated circuit. The processor is located in an optical pickup unit.

The supplemental second data comprises at least one of data indicative of serial number of a drive used to write to the optical storage medium; time and date data, copyright data, owner and/or authorization party, security level, and key for accessing encoded data on the optical storage medium. The step of modulating the locations further comprises at least one of modulating synchronization (sync) fields of the data, modulating a combination of synchronization and data fields of the data, frequency modulation, storing multiple bits using multiple level time steps, and modulating the transitions of the material states used to store the first data. In an embodiment, the method can further include applying an error correction code to the supplemental data.

In accordance with another aspect, the method to write the first and second data onto a storage medium can be used for tracking a plurality of copies of the optical media. The embedded supplemental data can help identify and track any copies made from the optical disk, for example.

In accordance with another aspect, an optical disk includes a storage medium with data stored thereon as a sequence of pits formed in the medium along a track, the location of pits along the track representing the stored data, each of the pits having two transition edges, the storage medium also including additional data embedded in the sequence of pits as by modulation of the locations of the transition edges of the sequence of pits which represent the stored data.

In accordance with another aspect, a method for reading secure data stored on an optical medium, having a plurality of pits and lands regions for storing the data, includes the steps of receiving an analog signal from a photodetector; processing the analog signal in a processor to identify, recognize and provide the data indicative of additional embedded stored information in the plurality of transition edges in the pits and lands regions of the optical medium; and decode the data indicative of the stored information in the plurality of pits and lands regions to provide the raw data stored. The step of processing the analog signal includes providing embedded data using an embedded data processor. The embedded data includes at least one of serial number of a drive used to write to the optical storage medium; time and date data, copyright data, owner and/or authorization party, security level, and key for accessing encoded data on the optical storage medium. The step of processing the analog signal includes decoding the embedded data by determining the timing of transitions of the pulses in the pits and lands regions. The timing of the transitions is below a predetermined tolerance level, such as determined by a jitter or timing error budget specified for the specific media.

The foregoing and other objects, features and advantages of the invention will be apparent from the following description, as illustrated in the accompanying drawings in which like reference characters refer to the same parts throughout the different views.

DETAILED DESCRIPTION

The embodiments described herein are directed to a device and methods for securely writing data to a computer storage device, for example, an optical medium and/or a magnetic medium and reading the secured data provided on the storage device. As used herein a "disc" refers to optical storage and "disk" refers to magnetic storage, however "disc" or "disk" can be used interchangeably to refer to storage media as a whole.

The methods described herein are predicated on the realization that securing the data stored on an optical disk is best done using a first stream of data that is embedded into a second stream of data by modulating the location of transition edges in the second stream of data. The systems that enable the methods herein use the hardware proximate to the laser diode and the photo-detector which writes and reads, respectively, the disk. There are different applications that can use the principles of the methods described herein, for example, access to data can be denied until proper codes are entered, disks of the storage media can be tracked and controlled by the embedded information with or without access to the actual data.

Figure 1:
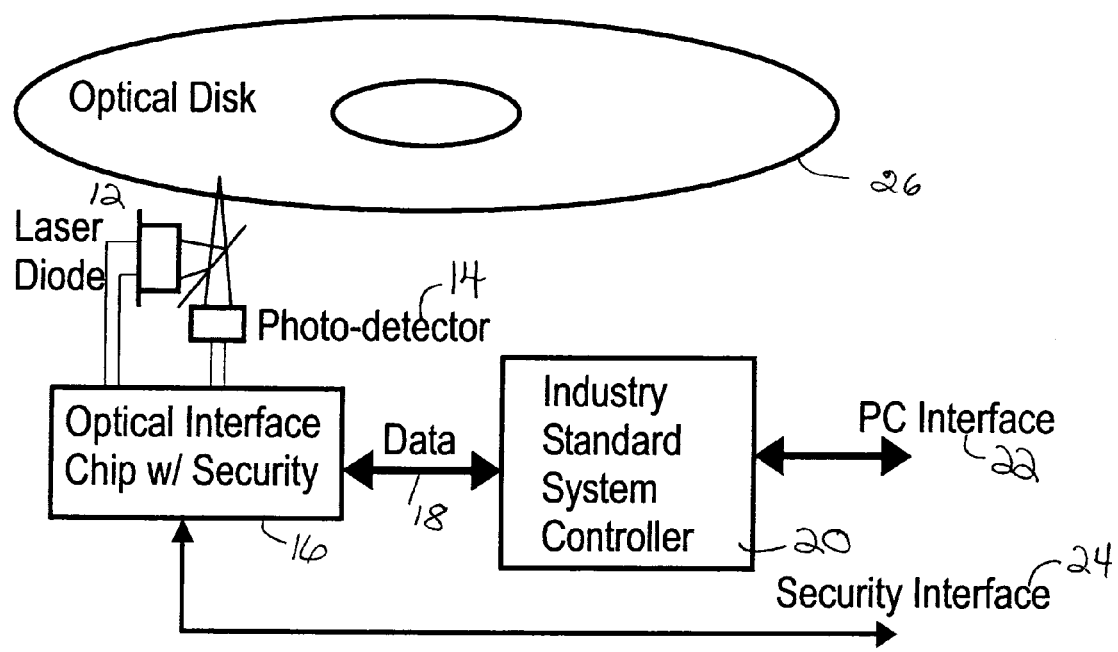
FIG. 1 is a diagram illustrating schematically and via functional blocks a system to encode and/or decode information in optical media using secure methods.

FIG. 1 is a diagram illustrating schematically and via functional blocks a system to encode and/or decode information or data in an optical media, for example, an optical disk using secure methods. A disk, whether magnetic or optical, consists of a number of tracks along which the information is recorded. These tracks may be concentric rings of a certain width or be of a spiral type. A fraction of the disk surface area is usually reserved for preformat information and cannot be used for data storage. Preformat information includes, for example, sector address information, synchronization marks, servo marks, which are embossed permanently on the optical disk substrate.

Data in the form of an input file is presented for storage using a personal computer (PC) interface 22. The PC interface 22 can be an integrated drive electronics (IDE) interface bus. The input data is then processed in an optical drive having a controller to generate processed data 18.

Prior to recording, additional bits are generally added to the data for error correcting coding and other housekeeping tasks. These include a certain amount of overhead on the user data. The error correction coding (ECC) is a systematic addition of redundant bits to a block of binary data, as insurance against possible read/write errors. ECC maps eight bits to fourteen bits to increase the size of the pits, resulting in eight-to-fourteen modulation. A given error correcting code can recover the original data from a contaminated block, provided that the number of erroneous bits is less than the maximum number allowed by that particular code. The data 18 has been processed using these error correcting processes that include encoding the input data using error correction codes.

The processed data represented as a sequence of bits written to the storage medium corresponds to a sequence of pits and gaps/lands along a track of the medium. The pattern of pits encode the signals in digital format. Therefore, data on a DVD, for example, is represented as a sequence of pits written helically on the disk. The information is recorded either around a series of concentric circular tracks or on a continuous spiral track. The sequence of pits are separated by gaps or lands. The transition regions of each of the pits as defined by a falling edge into a pit or rising edge out of a pit represents a binary "1". The different storage media have corresponding writing formats which specify how proximate two edges may be to each other. A DVD for example, has a different pattern of pits and lands than a CD. The basic unit of time for the pattern is "T" that is defined by a clock that is synthesized by a phase locked loop in the electronic circuitry used to write or read to or from a disk. In a CD, for example, the minimum pit or gap is defined as a 3T pulse while the maximum is 11T, whereas for a DVD the range is from 2T-14T. For example, 2T-14T is defined as two edges separated by no less than two zeroes and no more than 14 zeroes.

As described herein before, the optical storage media is a phase change media and as such is dependent, as a minimum, on a specific temperature and cooling rate to transition between a crystalline or amorphous state which in turn defines the formation of pits and lands/gaps on the optical media.

It is necessary to be able to evaluate the phase and frequency of the signal before a measurement of the signal timing error or modulation can be made. The timescale over which these measurements are averaged can be defined over a finite period of time or measure continuously over time. A phase locked loop, locked to identify every transition, provides such a timescale measure.

The output from the optical drive, i.e., the processed data 18 is then provided as an input to an optical pickup unit. This processed data 18 is the data represented in the "T" encoded format for the particular disk that will be written to.

Typically for a disk rotating at a particular speed, defined by revolutions per second, this rotational speed remains constant during the disk operation. The electronic circuitry used to write or read a disk has a fixed clock duration (T). The pulses of length T or an integer multiple thereof are used for writing to the disk.

Inside the optical pickup unit, an integrated circuit optical interface (chip) 16 controls the writing to the disk 26 via laser diode 12 and reading of the disk via the photo-detector 14 or a photo-detector array. The optical interface chip 16, for example, a CMOS integrated circuit, drives the laser and provides for the timing control of the laser pulses generated by the laser diode 12 for the writing process to the media. For example, in an embodiment, the integrated circuit can control the placement of transition edges of the pits within 5-10 ps. The optical interface chip 16 modulates the timing of the location of the transitions of the laser pulses or a portion of the pulses (sub-pulses) and writes or embeds supplemental data in these transition locations. The timing modulation of the transition edges is typically below a predetermined tolerance level defined by, for example, a timing error budget or a jitter budget specified for a particular optical medium. For example, 80-120 ps is the jitter specification of a DVD-RW written at a particular speed, for example, 8× write speed. The timing error budget depends on a plurality of factors such as, but not limited to, the medium, the format of the information, for example, audio data or video data, and the writing speed.

Writing on an optical media such as an optical disk involves precise timing control over the laser for the generation of transition edges of the pits on the disk which represent the digital content. The generation of transition edges, time stamping, laser modulation and pulse timing that are used in some embodiments described herein are described in U.S. Pat. Nos. 5,793,709 and 6,377,094 entitled "Free Loop Interval Timer and Modulator" and "Arbitrary Waveform Synthesizer Using a Free-running Ring Oscillator," respectively, the entire teachings of which are herein incorporated by reference. The arbitrary waveform synthesizer (AWS) using the free-running ring oscillator used in the described embodiments generates a waveform having a plurality of transition signals. These transition signals are selected from different free-running ring oscillator taps in response to control signals which identify where the rising or falling edges are to be placed. The AWS used in an embodiment provides precise edge transitions that can be controlled to a 5-10 picosecond timing precision level. The precise control of edge transitions enables the encoding of data in an embodiment described herein. Secondary data is embedded in the edge transitions using methods that modulate the timing of the edge transitions.

The embodiments described herein modulate the timing of transitions of the laser pulses by a small fraction of the normal pit/land times (for example, tens of picoseconds) and thus provide a method for encoding and storing information securely. The small timing variations do not effect the readability of the disc or disk in normal drives. That is, raw information that is embedded without any encryption code will not effect the readability of the disk in a conventional drive. If however, the raw data is encrypted then a conventional drive will not be able to read the data on the disk. To read the encrypted raw data, the embedded data is first read by the optical interface chip by detecting the precise timing variations containing therein the embedded data. The embedded data can be combined with a password to indicate the decryption information required to extract the raw information from the disk.

Figure 2:
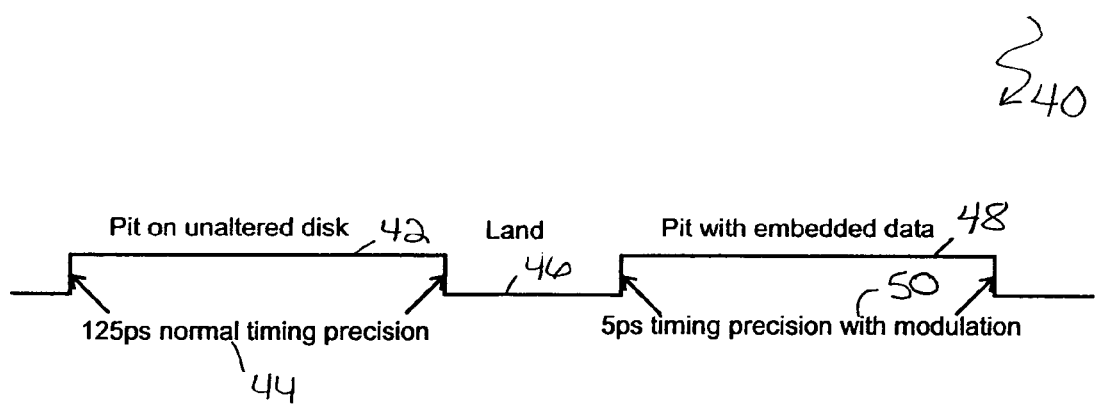
FIG. 2 is a diagram illustrating the recorded pits on a storage media in accordance with a described embodiment.

FIG. 2 illustrates a diagram of the pits and lands in an exemplary storage media, in particular, an optical disk. The land/pit pattern is representative of the data written to the disk as the data is written in the transitions between the pits and lands. In described embodiments, at the electrical level of a write signal, the pits can be defined as the raised portions 42, 48 or regions of a surface as on the optical disc or magnetic disk with the lands being gaps between the pits.

Conventional high performance CD and DVD drives use timing precisions, for example, of approximately 125 ps to generate the series of pits and lands which represent the stored data. High performance can be defined as having a speed of, for example 52× CD-RW. In contrast, a described embodiment allows a timing precision of <5 ps enabling sub-data modulation as illustrated in FIG. 2.

The embedded data can be any type of information that would be useful to embed. For example, it could include a serial number of the disk drive used to write to the disk and creation information such as, but not limited to time of creation, that would enable anybody who can read that data to identify who created the data and when. In the alternative, the embedded data could include decryption information which is necessary to decrypt the encrypted data that is represented by the locations of the pits and lands along the track of an optical disk.

Figure 3:
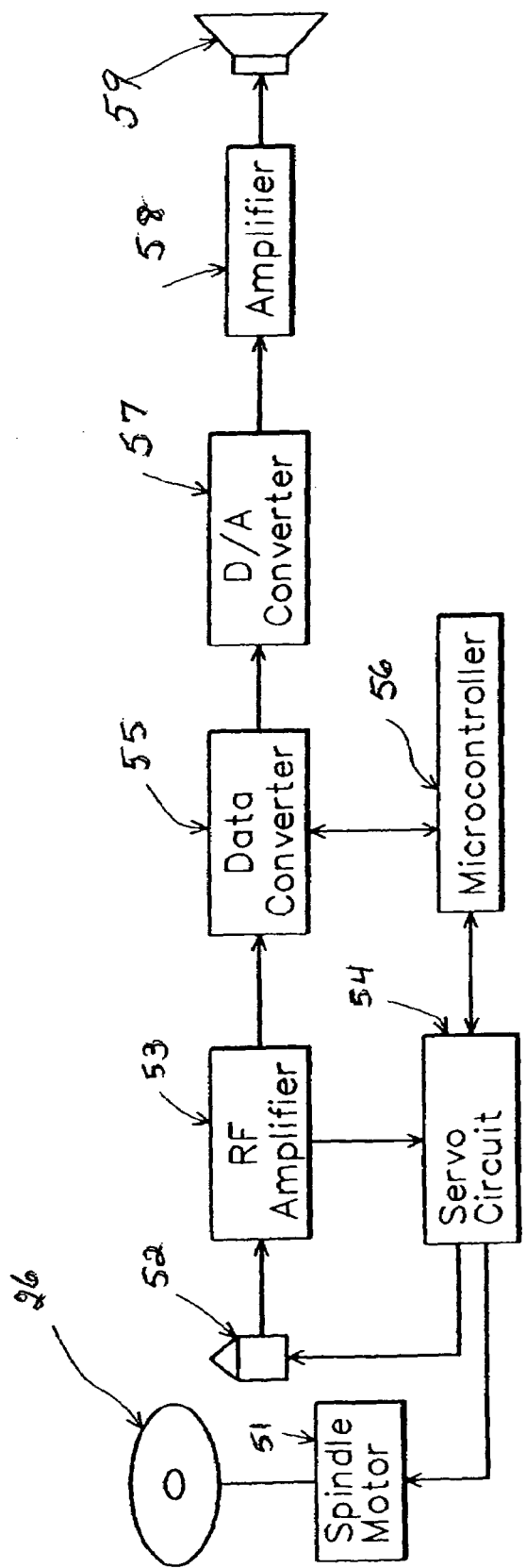
FIG. 3 is a schematic block diagram of a conventional CD player system.

As illustrated in FIG. 3, an optical disk player system conventionally includes a spindle motor 51, a laser pick-up head 52, a radio frequency (RF) amplifier 53, a servo circuit 54, a data processor 55, a microcontroller 56, a digital-to-analog converter (D/A) 57, an amplifier 58 and a loudspeaker 59. The spindle motor 51 is used to spin the optical disc 26 at a fixed speed during a read or playback operation to allow the data stored on the optical disc to be read out by the laser pick-up head or optical pick-up unit described herein before.

The data signal from the laser pick-up head is first amplified by the RF amplifier. The output of the RF amplifier is typically split into two parts. A first part of the amplified signal is transferred to the servo circuit and a second part is transferred to the data processor. The signal transferred to the servo circuit 54 is used for feedback controls of both the speed of the spindle motor 51 and the focusing and tracking of the laser pickup head 52. The amplified signal transferred to the data processor then undergoes processing at various data processing stages, such as, but not limited to, eight-to-fourteen modulation (EFM) decoding, subcode acquisition, error correction and detection (ECD) to obtain the readable data. For audio data, since the readable data in digital form is converted by the (D/A) converter into analog form. The analog form of the data may then be amplified.

An embodiment of an apparatus that secures information in storage media includes an integrated circuit chip, such as described in FIG. 1 as chip 16 in the optical pick-up unit. The processing method includes reading the data signal from a photo detector in the laser pickup unit. A PLL described herein before detects the transition edges in the data stream by being read from the optical disk. The processing includes detecting the timing of transition edges, for example, the phase detectors in the PLL sample the data and ascertain that a 4T pulse has been read followed by a 3T pulse by looking at a series of transitions. These 4T, 3T pulses are eventually decoded to provide the raw data. To detect embedded data, the transition time of each transition edge is analyzed to determine whether the location of the edge has been modulated. For example, it may be determined that the falling edge of the 4T pulse was advanced by 0.05T as the detected edge occurred at 4.05T. Thus, the transition edge is decoded to represent a binary "1".

During a read operation defined as the process to read an optical disk, the data bits stored in the altered pits/lands generate frequency components in the radio frequency (RF) signal. The RF signal is filtered to isolate these frequency components, and is demodulated to read the embedded data. This filtering and decoding is handled by a digital signal processor (DSP) in conventional optical units.

Different methods can be used to encode the embedded data. An embodiment of a method used to write information to a storage media can include modulating the pulse timing at a frequency selected for a particular optical standard and for a particular geographic region. The encoded pits corresponding to bits of data are written typically to a disk using frequencies of tens or hundreds of megahertz. This frequency can be amplitude modulated at a lower rate at the transition edges and thus be used to store data such as at a kilohertz rate. Further, various industry standard pulse codes are available which include error correction to insure reliable reading of the embedded data. Ideally, different countries could legislate unique encoding schemes making illegal exportation of content harder. Due to this potential requirement the technology supports many encoding formats.

Figure 4:
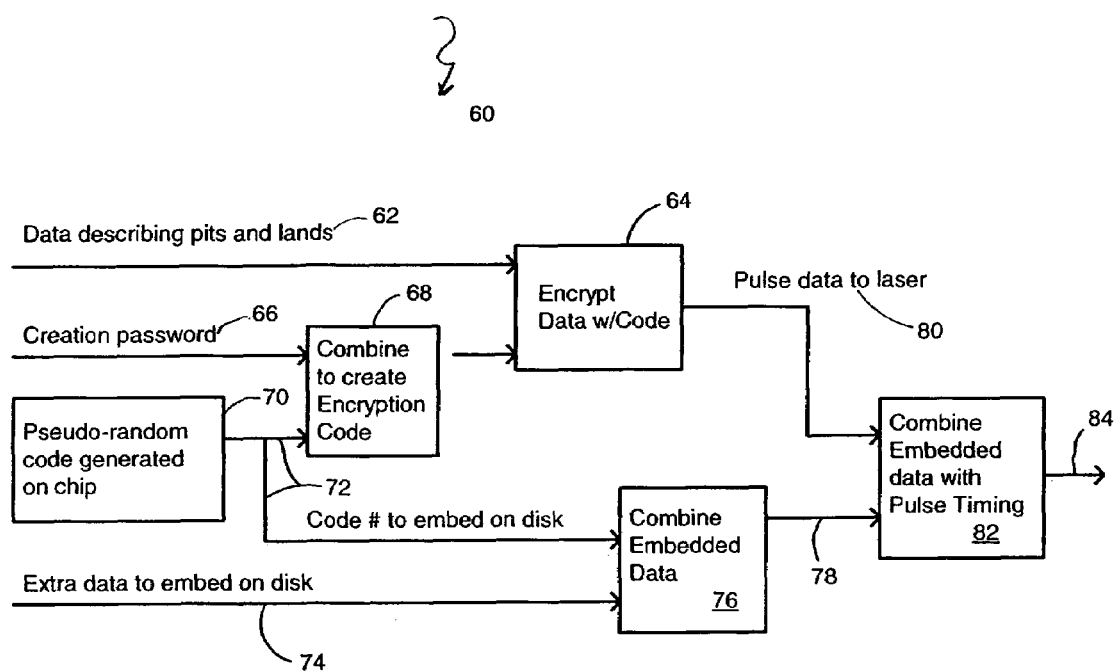
FIG. 4 is a block diagram illustrating a method for encoding data.

FIG. 4 illustrates one method 60 by which the user data can be encoded and decoded. Data indicative of a user created password 66 is input into block 68 along with a pseudo-random code generated in block 70. The created password 66 and pseudo-random code 72 are combined to create an encryption code. This encryption code is combined with data describing the sequence of pits and lands regions 62 corresponding to the sequence of data bits in block 64. The pseudo-random code is also combined with the extra data to be embedded on the disc in block 76. The output signal 78 of block 76 and the output signal 80 of block 64 form inputs to block 82. The output signal 80 indicative of pulse data to a laser along with the output signal 78 are combined to form a signal indicative of the embedded data with pulse timing. The pseudo-random code 72 is uniquely selected for each write operation defined as the process to write to the disk. The pseudo-random code 72 selected can be added to the embedded data so that during the read operation, the embedded data is first read to provide the encryption pattern used for the raw data. In a particular method, the embedded data is combined with a password to indicate the decryption information.

Figure 5:
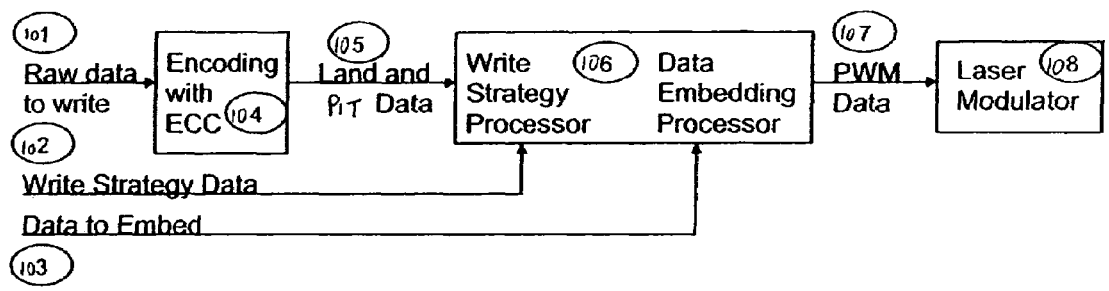
FIG. 5 is a diagram illustrating a data path for writing information securely on optical media using a read/write optical drive.

FIG. 5 illustrates details of another method for encoding embedded data in a data stream. As described briefly with respect to the schematic diagram illustrated in FIG. 1, the raw data 101 that needs to be stored on the storage media is encoded per an error correction code per step 104. This encoding results in data that is represented by the sequence of pits and lands that correspond to the sequence of date bits (data 105) which is provided as input to an integrated circuit 106. The integrated circuit 106 includes both a write strategy processor that has write strategy data 102 as an input and a data embedding processor that has an input data 103 to embed. The output of the integrated circuit 106 is the pulse width modulated (PWM) data 107 that is indicative of the embedded data with the pulse timing information such as the timing of the transition edges of the pulses which determine the location of the edges of the pits on the media. This PWM data 107 forms an input to a laser modulator 108.

Figure 6:
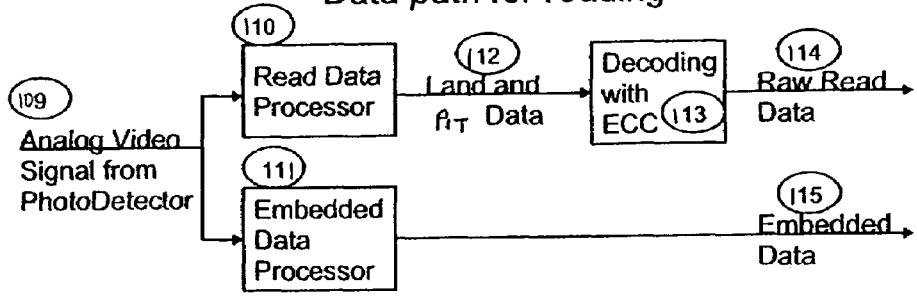
FIG. 6 is a diagram illustrating a data path for reading information from a disk that was written to using the method described with respect to FIG. 5.

FIG. 6 illustrates a method 120 for reading a disk that was written to by using the system described with respect to FIG. 5. The method 120 includes receiving an analog signal 109, for example, a video signal, from a photo-detector and providing this signal 109 to both a read data processor 110 and an embedded data processor 111 in an integrated circuit such as Chip 16 in FIG. 1 illustrated. The read data processor 110 processes the analog signal 109 to provide information regarding pit and gap data 112 which is representative of the encoded raw data as defined by a sequence of pits and lands, for example, a 3T pit followed by a 4T land, followed by a 3T pit. This pit and land data is then decoded using an error correction code per step 113 to produce raw data 114. The embedded data processor 111 processes the analog video signal 109 to produce an output indicative of embedded data 115.

In the encoding method 100, information is embedded in the sync pattern or fields of the pits and lands. The pattern of the pits and lands in an optical storage medium include a sync field, a header field and a data field. The sync field is fairly universal in optical storage formats. Generally, the sync field consists of equal timing of pit and land. The equal timing pattern allows the drive to dynamically adjust the read circuit for best results. No data is usually stored in the sync field. Altering the timing of the sync field to embed data insures that normal data storage on the media is unaltered in an embodiment. Data fields of the pits can be used to store embedded data but the deliberate timing variations necessary to do that may degrade to the reading process by adding noise.

Figures 7A, 7B:
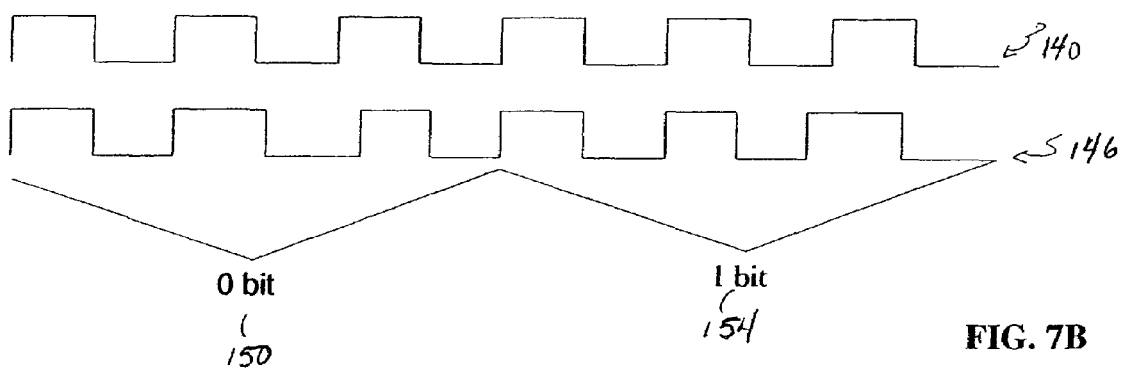
FIGS. 7A and 7B illustrate how data could be embedded in a sync field.

FIGS. 7A and 7B illustrate how data could be embedded in a sync field. For each bit of embedded data, three pit-land pairs are used. In FIG. 7B, the first pit-land pair uses normal timing. For a 0 bit, the second pair is longer and the third pair shorter. For a 1 bit, the second pair is shorter and the third pair longer. The details of the media, the format data vs. video data format and the writing speed dictate the time suitable variation as described with respect to the timing error budget. In an embodiment, for 52× CD-RW a timing variation of 40 ps is appropriate. Bits can be strung together to represent multi-bit values. In a normal sync field, three transitions may be needed to define a bit, for example, with 8 bits being stored in a single sync field. For disk formats where one sync field is not able to hold all the required embedded data, several sync fields are grouped together. Starting with an unmodified sync field, to indicate the beginning of a sync group, each successive sync holds additional bits of the embedded data. Decoding the embedded data from the sync field is provided by timing the transitions in the pulses. The modulated data is derived from the transition times.

Many other methods can be used to represent embedded data. For example, data fields can be modulated in combination with the sync fields, methods can be varied and combined, frequency modulation can be used with industry standard data encoding, multiple level time steps can be used to store multiple bits, the transitions of the material states may be modulated, error correcting codes can be applied to the embedded data, and multiple copies of the same data can be written to accommodate scratched or corrupt media.

Embedded data can be used in one of various ways. The simplest use might be embedding the serial number of the drive used to write the data. This allows tracking the source of the data. Additional data can be embedded, such as, for example, (1) time and date stamp indicative of when the disk was written; (2) copyright information; (3) data indicative of owner or authorizing party; (4) data indicative of security level; and (5) key used to access encoded data on the media.

In view of the wide variety of embodiments to which the principles of the embodiments of present invention can be applied, it should be understood that the illustrated embodiments are exemplary only, and should not be taken as limiting the scope of the claims. For example, the steps of the block diagrams, for example FIG. 5 and FIG. 6, may be taken in sequences other than those described, and more or fewer elements may be used in the diagrams. While various elements can be implemented in software, other embodiments in hardware of firmware implementations may alternatively be used, and vice-versa. Further, though the embodiments described herein disclose encoding and decoding data or information on different media, the methods provided herein can also be applied to signals. Thus, the methods described herein can be used to create a signal having embedded data therein by modulating the timing of transition edges in the pulses of the signal. The signal can then be transmitted to a location and decoded using the methods to decode as described herein.

It will be apparent to those of ordinary skill in the art that methods involved in the device and methods for securing information in optical storage media may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

Other aspects, modifications, and embodiments are within the scope of the following claims.

What is claimed is:

1. A method of storing first data and second data on a storage medium, said method comprising:

representing the first data as a first sequence of bits that are in a format that is appropriate for writing to the storage medium;

representing the second data as a second sequence of bits; and writing the first sequence of bits to the storage medium as a corresponding sequence of pits along a track, wherein the location of the pits along the track represents the stored first data, and while writing of sequence of pits along the track modulating the locations at which a plurality of transition edges of the sequence of pits are written to embed the second data in the sequence of pits.

2. The method of claim 1, wherein the step of representing the first data as a first sequence of bits comprises processing the first data using an error correcting process.

3. The method of claim 1, wherein the step of writing comprises using a processor implemented within an integrated circuit.

4. The method of claim 1, wherein the storage medium comprises one of an optical storage medium, a magnetic storage medium or a combination thereof.

5. The method of claim 1, wherein the sequence of pits are defined by one of a material state of the medium.

6. The method of claim 5, wherein the material state of the medium is one of a crystalline or amorphous state of the storage medium.

7. The method of claim 1, wherein the storage medium is a phase change medium.

8. The method of claim 1, wherein the storage medium comprises an optical disc such as a compact disc (CD), a compact disc-read/write (CD-RW) or a digital versatile disc (DVD).

9. The method of claim 1, wherein modulating the locations further comprises modulating the timing of the transition edges within a fraction of a timing error budget defined for the storage medium.

10. The method of claim 9, wherein the fraction of the timing error budget is in a range of approximately a quarter to a third of the timing error budget.

11. The method of claim 1, wherein the second data comprises at least one of data indicative of serial number of a drive used to write to the optical storage medium, time and date, copyright, owner and/or authorization party, security level, and a key for accessing encoded data on the optical storage medium.

12. The method of claim 1, wherein the step of modulating further comprises at least one of modulating synchronization fields of the data, modulating a combination of synchronization and data fields of the data, frequency modulation, storing multiple bits using multiple level time steps, and modulating the transitions of material states used to store the first data.

13. The method of claim 1, further comprising processing the second data using an error correcting process.

14. The method of claim 13 wherein the error correcting process comprises error correction codes.

15. The method of claim 1, wherein each of the plurality of transition edges comprise one of at least a rising edge of a pit and a falling edge of a pit.

16. An optical disk comprising a storage medium with data stored thereon as a sequence of pits formed in the storage medium along a track, the location of the sequence of pits along said track representing the stored data, each pit in said sequence of pits having two transition edges, said storage medium also including additional data embedded in the sequence of pits at a plurality of locations corresponding to modulated transition edges of the sequence of pits which represent the stored data.

17. The optical disk of claim 16, further comprising a processor coupled to the optical disk for processing the data using an error correcting process.

18. The optical disk of claim 17, wherein the processor is implemented within an integrated circuit.

19. The optical disk of claim 16, wherein the storage medium comprises one of an optical storage medium, a magnetic storage medium or a combination thereof.

20. The optical disk of claim 16, wherein the sequence of pits are defined by one of a material state of the medium.

21. The optical disk of claim 20, wherein the material state of the medium is one of a crystalline or amorphous state of the storage medium.

22. The optical disk of claim 16, wherein the storage medium is a phase change medium.

23. The optical disk of claim 16, comprises one of a compact disc (CD), a compact disc-read/write (CD-RW), CD-R, a digital versatile disc (DVD), DVD-R, and DVD-RW.

24. The optical disk of claim 16, wherein the modulated transition edges comprise varying the timing of the location of the transition edges within a fraction of a timing error budget defined for the storage medium.

25. The optical disk of claim 24, wherein the fraction of the timing error budget is in a range of approximately a quarter to a third of the timing error budget.

26. The optical disk of claim 16, wherein the additional data comprises at least one of data indicative of serial number of a drive used to write to the optical storage medium, time and date, copyright, owner and/or authorization party, security level, and a key for accessing encoded data on the storage medium.

27. The optical disk of claim 16, wherein the modulated transition edges comprise at least one of modulated synchronization fields of the data, modulated combination of synchronization and data fields of the data, frequency modulation, and modulated transitions of material states used to store the data.

28. The optical disk of claim 17, wherein the processor processes the additional data using an error correcting process.

29. The optical disk of claim 28 wherein the error correcting process comprises error correction codes.

30. The optical disk of claim 16, wherein each of the plurality of transition edges comprise one of at least a rising edge of a pit and a falling edge of a pit.

31. A method for reading first data written on an optical storage medium, the storage medium having a sequence of pits along a track, wherein the location of the pits represents the first data, the method comprising the steps of:

receiving an analog signal having a first data and a second data from a photodetector;

processing the analog signal in a processor to generate the second data indicative of embedded supplemental stored information in a plurality of transition edges of the pits on the optical storage media; and decoding the analog signal to generate the first data indicative of raw data stored in the plurality of sequence of pits.

32. The method of claim 31, wherein the step of processing the analog signal further comprises providing the second data indicative of embedded supplemental information using an embedded data processor implemented within an integrated circuit.

33. The method of claim 31, wherein the embedded supplemental data comprises at least one of data indicative of serial number of a drive used to write to the optical storage medium; time and date, copyright information, owner and/or authorization party, security level, and a key for accessing encoded data on the optical storage medium.

34. The method of claim 31, wherein the step of processing the analog signal comprises decoding the second data by determining timing of transitions of a plurality of edges of the pits that are below a predetermined timing tolerance level.

35. A computer readable medium having stored therein instructions for causing a processing unit to read first data written on an optical storage medium, the storage medium having a sequence of pits along a track, wherein the location of the pits represents the first data, said instructions for causing the processing unit to execute the steps of:

receiving an analog signal having a first data and a second data from a photodetector;

processing the analog signal in a processor to generate the second data indicative of embedded supplemental stored information in a plurality of transition edges of the pits on the optical storage media; and decoding the analog signal to generate the first data indicative of raw data stored in the plurality of sequence of pits.

* * * * *